(12) United States Patent
Litster et al.

(10) Patent No.: US 7,113,904 B2
(45) Date of Patent: Sep. 26, 2006

(54) SYSTEM AND METHOD FOR PROVIDING DYNAMIC MULTIPLE LANGUAGE SUPPORT FOR APPLICATION PROGRAMS

(75) Inventors: Andre Litster, Morgan, UT (US); Shaun Broadhead, Heber City, UT (US)

(73) Assignee: Park City Group, Park City, UT (US)

( * ) Notice: Subject to any disclaimer, the term of this patent is extended or adjusted under 35 U.S.C. 154(b) by 301 days.

(21) Appl. No.: 09/822,644

(22) Filed: Mar. 30, 2001

(65) Prior Publication Data

US 2003/0046059 A1    Mar. 6, 2003

(51) Int. Cl.
*G06F 17/20* (2006.01)
(52) U.S. Cl. ............................................... 704/8
(58) Field of Classification Search ............... 704/2–8; 715/536; 345/333, 334, 348, 740; 717/2, 717/5
See application file for complete search history.

(56) References Cited

U.S. PATENT DOCUMENTS

| | | | | |
|---|---|---|---|---|
| 5,551,055 A | * | 8/1996 | Matheny et al. | 704/8 |
| 5,583,761 A | * | 12/1996 | Chou | 704/8 |
| 5,644,775 A | * | 7/1997 | Thompson et al. | 704/7 |
| 5,652,884 A | * | 7/1997 | Palevich | 707/100 |
| 5,678,039 A | * | 10/1997 | Hinks et al. | 704/8 |
| 5,907,326 A | * | 5/1999 | Atkin et al. | 345/334 |
| 5,974,372 A | * | 10/1999 | Barnes et al. | 704/8 |
| 6,275,978 B1 | * | 8/2001 | Bell | 717/2 |
| 6,339,755 B1 | * | 1/2002 | Hetherington et al. | 704/8 |
| 6,469,713 B1 | * | 10/2002 | Hetherington et al. | 345/740 |
| 6,490,547 B1 | * | 12/2002 | Atkin et al. | 704/8 |

* cited by examiner

*Primary Examiner*—Richemond Dorvil
*Assistant Examiner*—Lamont Spooner
(74) *Attorney, Agent, or Firm*—Kory D. Christensen; Stoel Rives, LLP (57) ABSTRACT

In response to a user activating a language switching mechanism to indicate a newly selected language, a language switch component sends a language key that corresponds to a first language sensitive element displayed in the user interface to a language resource manager. The language resource manager retrieves from a language resource bundle, which corresponds to the newly selected language, a second language sensitive element. The language switch component then replaces the first language sensitive element with the second language sensitive element. The replacement process is then repeated for all language sensitive elements in the user interface.

41 Claims, 8 Drawing Sheets

Spanish
Language
Resource File
510

602 — #Tool Bar Titles---------------------  ← 603
604 — Delete_title   = Cancelacion
Open_title    = Abierto
Exit_title    = Salen
                610
606 — New_title   = Nuevo                  — 608

Search_title  = Hallazgo
                                                      614
612 — Undo_title    = "\u65e5\u672c\u8a9e\u6587\u5b57\u5217"

Tool Bar Icons ---------------------

618 — New_icon   = icon\:new.gif  — 616

Save_icon   = icon\:c:\icons\save.gif
----------------------
Splash_image      = Image\:default_splash.jpg

SYSTEM AND METHOD FOR PROVIDING DYNAMIC MULTIPLE LANGUAGE SUPPORT FOR APPLICATION PROGRAMS

BACKGROUND OF THE INVENTION

1. Field of the Invention

The present invention relates generally to the field of data processing. More specifically, the present invention relates to a system and method for providing dynamic support for multiple languages within one or more application programs.

2. Description of Related Background Art

In the early development of the software industry, engineers and developers knew the demographics of those who would use an application program. Generally, due to the cost of software and hardware, users tended to be middle to upper class business people who speak English. Additionally, the developers and designers of the application programs were of the same culture and nationality as the users of the programs. Translation and support for multiple languages was not an important issue.

Today, however, with inexpensive hardware and software being used at almost every level of society, support for multiple languages in an application program is a very important issue. The importance of multiple language support has also increased due to globalization. Businesses compete more now than ever across international borders. Often a business will have several offices around the world. As a result, the developers of an application program often speak different languages than the end 0 users of the program.

To accommodate users of different languages, developers identify which elements of the program are sensitive to difference in language between users. Generally, these elements are the displayable elements of the program's user interface. These elements of the user interface are referred to herin as language-sensitive elements (LSEs). LSEs may include displayable elements such as symbols, numbers, text, icons, graphics, and the like. LSEs are not limited solely to words and phrases. Likewise, some icons or graphics may be understood by only a particular culture. Additionally, certain audio clips such as tones, chimes, and the like may be LSEs. The definition of which elements of an application program user interface are LSEs depends largely on who the potential user of the application program will be.

A conventional approach to providing multiple language support is to distribute an alternative set of LSEs with the application program code. Generally, this is implemented in one of two ways. First, the actual code of the program may include alternate text messages, icons, and other LSEs that are compiled and distributed with the program code. The alternate LSEs are displayed based on a global language indicator condition. For example, if the language indicator is English, then "Hello" is displayed. If the language indicator is Spanish, then "Hola" is displayed. Similar conditions may be dispersed throughout an application program. Under this technique, modifying and adding support for new languages to each LSE is very expensive because a computer programmer is needed to navigate through the code to change the LSE conditions.

A second conventional approach for supporting multiple languages is to build separate user interface code. For example, one set of code may display a set of database fields and field indicators to identify each field in a user interface window. The field indicators are generally LSEs. Therefore, a completely identical set of computer code may exist to perform all of the same functions as the first, but simply include field indicators translated into the the desired languages. As a new language must be supported, the code containing LSEs is then duplicated and the field indicators are translated.

The two conventional approaches outlined are generally referred to as "hard coded" approaches and have several limitations. First, the application program code must be changed each time a new language is to be supported or an error in translation is found. Second, changes must be implemented by a computer programmer so that the application code continues to function properly. Because the changes are hard coded into the application program, the cost of fixing or modifying the program is very high. Also, duplicating the computer code increases the amount of code which must be changed if a programming bug is discovered. Additionally, each change in an LSE may require that the whole set of application program code be updated. Third, the indicator of which language the application program is to use is generally only set when the application program begins execution. Even if the language indicator may be changed, the whole program generally must be re-started to implement the change.

Application programs that support multiple languages have generally made assumptions about the user to simplify the task of providing multiple language support. For example, it is often assumed that the language used in the Operating System (OS) of a computer is the same one the user will want for application programs executing on that OS. Alternatively, it is assumed that the physical location of a particular computer is a reasonable indicator as to what language the user desires to use for all application programs on the computer.

Because these assumptions may not always be true, most OSs allow the user to modify the OS configuration settings to support a different language. However, the process generally requires that the computer system be powered down and re-booted. Re-booting generally takes from one to five minutes. Sometimes, the user does not know how, or is not allowed, to change the OS configuration settings.

While assumptions about the desired user language may have worked in the past, today's diverse workplace have made the assumptions impractical. More and more companies and organizations operate offices in various different countries. Additionally, people often live in countries whose native language differs from their own. Clear communication between the user and the application program is vital.

Conventional multiple language support by re-booting the OS or re-starting an application is impractical. For example, applications that serve as point of sale (POS) terminals, i.e. check-out stands for a retailer, are often operated by a minimum wage employee whose native language may differ from the majority of people where the store is located including the manager. Re-booting the terminal for an exchange of employees, or to allow a supervisor to momentarily operate the terminal, causes delays which most customers will not tolerate. Similarly, re-starting the application may require a sales transaction to be re-initiated as well. Configuration changes to support a different language and re-starting may lead to a significant loss of business.

Accordingly, what is needed is a system and method for providing dynamic multiple language support for application programs. What is also needed is a system and method for providing dynamic multiple language support for application programs that allows new languages to be supported without using expensive application programmer resources.

Additionally, what is needed is a system and method for providing dynamic multiple language support for application programs that separates application program support and upgrades from those relating to language translations. What is also needed is a system and method for providing dynamic multiple language support for application programs that does not require re-booting the computer system or re-starting the application program to change which language is being used. What is also needed is a system and method for providing dynamic multiple language support for application programs that allows for dynamic switching of the current language of the user interface based on who the user is rather than the location of the machine or configuration of the operating system.

BRIEF DESCRIPTION OF THE DRAWINGS

Non-exhaustive embodiments of the invention are described with reference to the figures, in which.

DETAILED DESCRIPTION OF THE PREFERRED EMBODIMENTS

The present invention solves the foregoing problems and disadvantages with a system and method for providing dynamic multiple language support for application programs. For example, in response to activation of a language switching mechanism, Language Sensitive Elements (LSEs) of a Graphical User Interface (GUI) in an application program are replaced with LSEs that correspond to a newly selected language. An LSE may be text, an icon, a graphic, a video clip or the like.

In one embodiment, in response to activation of a language switching mechanism an application program is preempted. A state of the current GUI and/or application is saved, after which the current GUI is discarded. Then, a new GUI is generated having LSEs that correspond to a newly selected language.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, user selections, network transactions, database queries, database structures, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Figure 1:
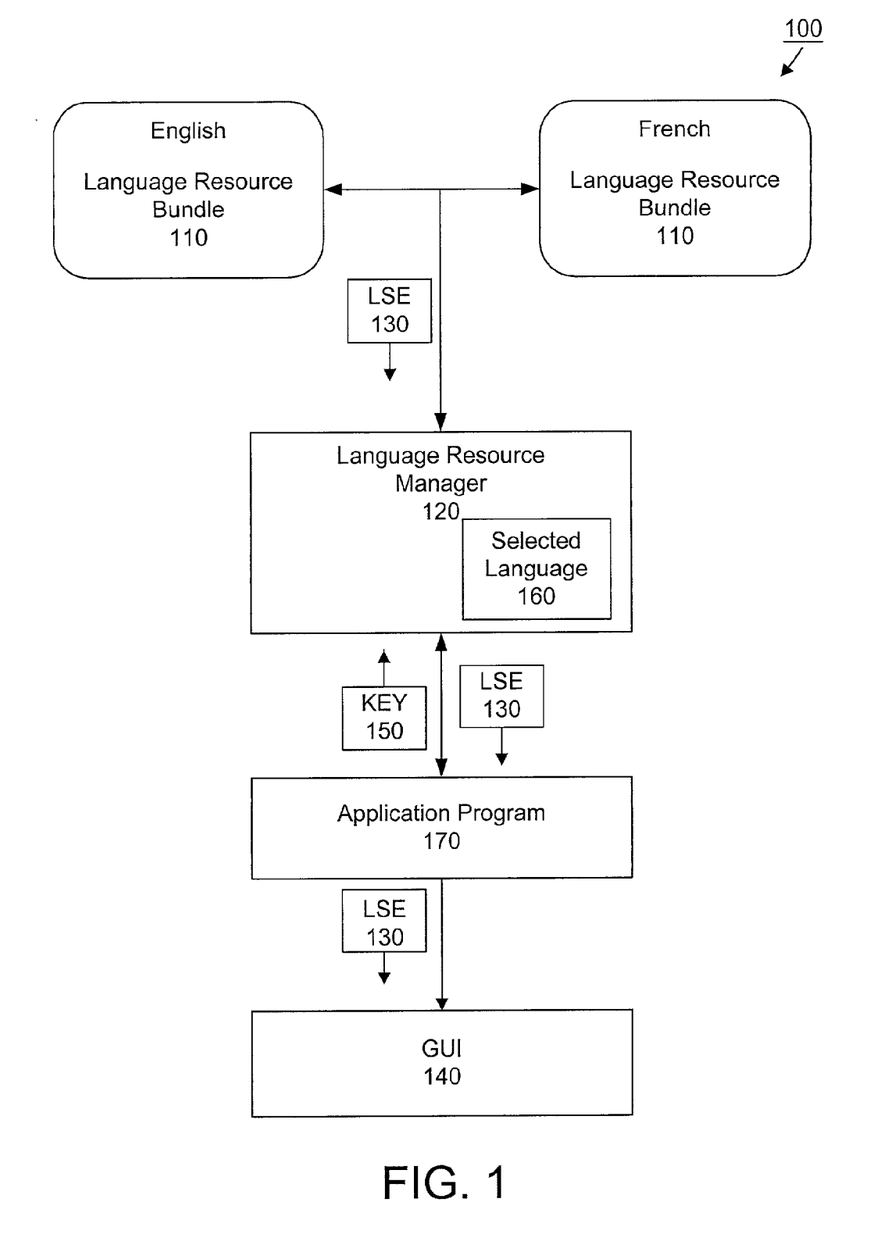
FIG. 1 is a schematic block diagram of a system for managing multiple languages.

Referring now to FIG. 1, there is shown a system 100 for managing multiple languages. In one implementation, the system 100 includes one or more language resource bundles 110 (LRBs) and a language resource manager 120 (LRM). The LRM 120 uses one or more LRBs 110 to provide language sensitive elements 130 (LSEs) for display in a graphical user interface 140 (GUI).

An LRB 110 stores associations between language keys 150 and displayable LSEs 130. For each language supported by the system 100, there is preferably a unique LRB 110. For example, in the illustrated embodiment, a separate LRB 110 exists to support the English and French languages. The LRB 110 is preferably an object data structure. Alternatively, an LRB 110 may be implemented as an array, a linked list, or other data structure well known in the art.

In one embodiment, an LRM 120 provides logic to receive a language key 150, access the appropriate LRB 110, and provide an LSE 130 that corresponds to the language key 150. Preferably, the LRM 120 stores an indicator of the currently selected language 160. The currently selected language 160 identifies which LRB 110 should be used in retrieving LSEs 130 forgiven language keys 150. Preferably, the currently selected language 160 is set by default when the system 100 begins execution. In one embodiment, the selected language 160 is the same language used in the operating system of the computer. Alternatively, the selected language 160 may be set initially from a configuration file, registry setting, or other like initialization structure.

In general, the purpose of the LRM 120 is to receive a language key 150 and respond with an LSE 130 associated with the language key 150. Preferably, a language key 150 is a unique identifier for an element that an application program 170 is programmed to display in a Graphical User Interface 140 (GUI).

For example, the application program 170 may conventionally be programmed to display the text "Hello World," which is an LSE 130. The text generally must be displayed in different languages in order to be properly understood by users having different native languages. In one embodiment, the application program 170 is programmed to display a language key 150 such as "LK_GREETING". The application program 170 may be programmed to recognize language keys 150 as those variables that have an "LK_" prefix. The application program 170 is programmed, in one implementation, to take the language key 150, "LK_GREETING", and pass it to the LRM 120.

Those of skill in the art readily recognize various other implementations that would allow the application program to recognize language keys 150 to be passed to the LRM 120. For example, a special LSE display routine may be implemented that receives language keys 150, retrieves LSEs 130 using the LRM 120, and then displays the LSE 130 in different ways based on the type of LSE 130. This and other implementations are considered within the scope of the present invention.

The LRM 120 receives the language key 150. Based on the currently selected language 160, the LRM 120 searches the LRB 110 corresponding to the selected language 160 for the language key 150. Once found, the LRM 120 retrieves from the LRB 110 the LSE 130 corresponding to the language key 150.

For example, if the selected language 160 is French and the language key is "LK_GREETING", the LRM 120 would search the French LRB 110 for the language key 150. The language key 150 is associated with an LSE 130 such as "Allo Monde". In this example, the LSE 130 is a translation of the text string "Hello World". The LRM 120 then passes the LSE 130 to the application program 170.

The application program 170 receives the LSE 130 and displays the LSE 130 in a GUI 140 maintained, in one configuration, by the application program 170. The LSE 130 may be of various different types. For example, the LSE 130 may be a symbol, a character, a string, a number, an icon, a graphic, a sound clip, a video clip, or other similar element that may be subject to differences between languages.

An LSE 130 may include, for example, a whole graphic user interface object or a sub-part of a graphical user interface object. For example, an LSE 130 may be embodied as a simple string displayed in a window. Alternatively, an LSE 130 may be the title attribute of a window object, or a menu display string for an item in a menu object.

LSEs 130 may exist at various different levels within an application program 170. For example, LSEs 130 may be used in the application program 170 to produce reports, charts, or other human readable output besides a GUI 140. LSE's may be defined for these forms of application program 170 output as well.

In the case of a string LSE 130, such as "Allo Monde", the application program 170 simply displays the string at a certain location within the GUI 140. The same steps as described above may be followed for subsequent language keys 150.

Using the components discussed above, the system 100 in the illustrated embodiment is capable of supporting an application program 170 with one or more different languages. In this manner, language translations for LSEs 130 and application programming are separated.

The application program 170 may be written using language keys 150. The translations and support of different languages is managed by providing different LRBs 110. This separation provides less complicated application program code. The separation also provides flexibility in supporting multiple languages. Based on the selected language 160, an application program 170 is capable of generating a GUI 140 using LSEs 130 from any of the languages having corresponding LRBs 110.

Figure 2:
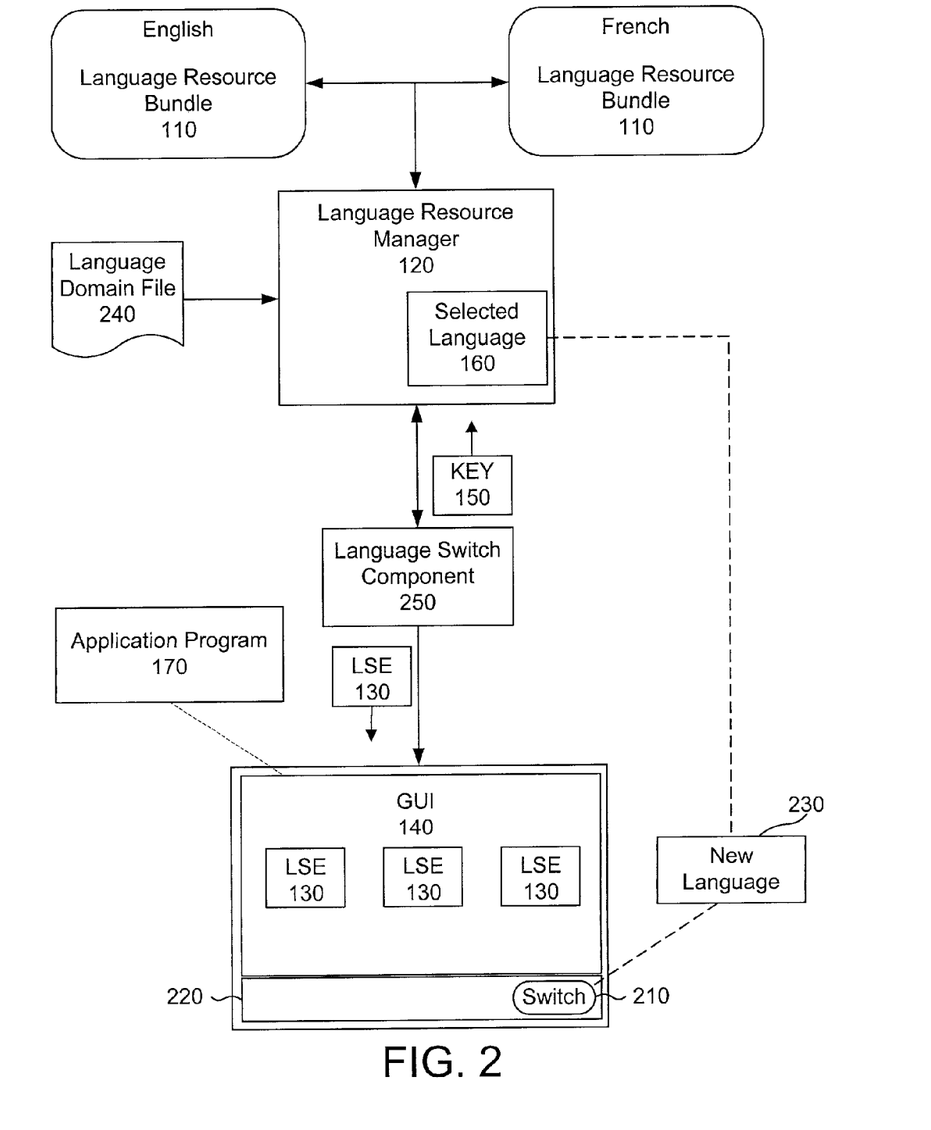
FIG. 2 is a schematic block diagram of a system for switching between multiple languages.

FIG. 2 illustrates one embodiment of a system 200 for dynamically switching from one selected language 160 to another. The system 200 includes a plurality of LRBs 110 and a Language Resource Manager 120 (LRM), as described in connection with FIG. 1.

The LRM 120 includes a language switching mechanism 210 which allows a user to dynamically change the language the application program 170 uses in the GUI 140. Preferably, the language switching mechanism 210 is a user interface component such as a drop-down list of available languages, a menu item, a button, an edit box, an icon, or other like user interface component that a user may activate to indicate a desire to change the selected language 160. Those of skill in the art recognize that the language switching mechanism 210 may activate other user interface components such as a pop-up menu, pop-up window, or other component to allow a user to further designate what the selected language 160 is to be.

In the illustrated embodiment, the language switching mechanism 210 is implemented in the GUI 140 as a button 210 on a status bar 220. The user may click on the button 210 to cause a pop-up window (not shown) to appear in the GUI 140. The pop-up window may display two or more buttons indicating different languages that may be selected. The user may then select a language button, after which the pop-up window provides an indicator of the new language 230 to the language switching mechanism 210.

In one embodiment, the LRM 120 provides the language switching mechanism 210 with a set of two or more languages that the system 200 is configured to support. This set may be generated using various configuration and/or initialization techniques. As shown in FIG. 2, a language domain file 240 provides the LRM 120 information about which languages are supported and which language should be the initial selected language 160. Alternatively, a OS registry setting, initialization file, or other technique may be used.

In an alternative embodiment, the LRM 120 may include a component that allows the language to be changed by one or more keystrokes or other indications of a user input device such as a keyboard, mouse, or the like. For example, a key on a keyboard may be configured as a language toggle switch. Pressing the key may cause the system 200 to switch the language from a currently selected language 160 to a next language in an ordered list of supported languages. Alternatively, particular keyboard function keys may be associated with switching the selected language 160 to a particular supported language.

As depicted in FIG. 2, an initial GUI 140 may be created by an application program 170 as described in relation to FIG. 1. The GUI 140 may include one or more LSEs 130 provided by the LRM 120. Additionally, the GUI 140 includes the language switching mechanism 210 associated with the LRM 120. The application program 170 may then continue to create new LSEs 130 as necessary in the manner described for FIG. 1.

Once the application program 170 is executing, a user may indicate, using the language switch mechanism 210, a desire to change the language used in the GUI 140. First, the user selects the language switching mechanism 210. As described above, the user indicates what the new language 230 is to be. The LRM 120 then updates the selected language 160 to be the new language 230. Additionally, the LRM 120 signals to a language switch component 250 that the selected language 160 has changed.

A language switch component 250 allows the system 200 to dynamically change the language used in an application program 170. This is accomplished by the language switch component 250, in one embodiment, by replacing currently displayed LSEs 130 with new LSEs 130 from the LRB, 110 corresponding to a new language 230.

The language switch component 250 is activated, in one implementation, by a change in the selected language 160. For example, the LRM 120 may notify the language switch component 250 that the selected language 160 has changed. Once the selected language 160 has changed, the language switch component 250 sends a language key 150 associated with a first LSE 130 of the GUI 140 to the LRM 120. The LRM 120 retrieves a second LSE 130 from an LRB 110 corresponding to the selected language 160, the new language 230. The LRM 120 sends the second LSE 130 to the language switch component 250. Thereafter, the language switch component 250 replaces the first LSE 130 with the second LSE 130.

Similarly, the language switch component 250 may iterate through all the LSEs 130 of the GUI 140 replacing the current LSEs 130 with LSEs 130 that correspond to the new language 230. In this way, the LSEs 130 of a GUI 140 may be dynamically changed from one language to another. This allows the application program 170 to operate independent of a language change. Additionally, the application program 170 provides LSEs 130 based on the needs of the user.

As an example, suppose the primary language of a supervisor is French and a worker operating the application program 170 speaks primarily English. The application program 170 may be initialized in English based on the domain file 240. Alternatively, the worker may select the language at the beginning of a shift. If the worker has a question, the supervisor may wish to examine the GUI 140 in his or her own language, French. To do so, the supervisor activates the language switching mechanism 210 and indicates French as the new language 230. The selected language 160 changes to French and the language switch component 250 is notified. The language switch component 250 then iterates through all the LSEs 130 of the GUI 140. For each LSE 130 the language switch component 250 uses the language key 150 associated with the current LSE 130 to retrieve a new LSE 130 from the French LRB 110. The English LSE 130 is replaced with the French LSE 130. Similarly, when the languages are switched back for the worker, the French LSEs 130 are replaced by English LSEs 130.

Identification of the LSEs 130 and the language keys 150 may be accomplished by providing the language switch component 250 access to a common data structure that records the current LSEs 130. Of course, other techniques may allow the language switch component 250 to access the displayed LSEs 130, such as object method calls, arrays of currently displayed LSEs 130 and the like. Similarly, replacement may be accomplished by execution of LSE replacement methods within each LSE 130. These and other similar techniques for identifying characteristics such as the language keys 150 and causing the LSE 130 to be replaced are considered within the scope of the present invention.

Figure 3:
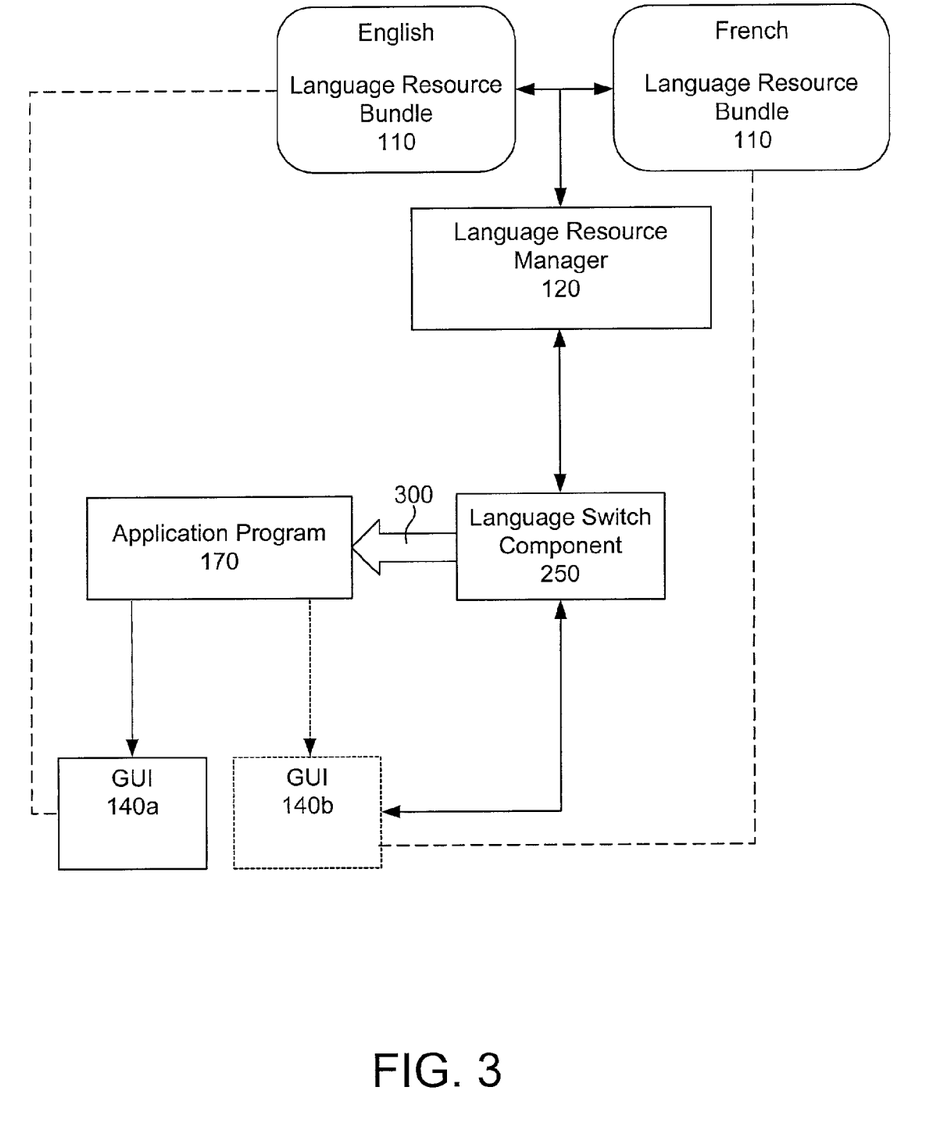
FIG. 3 is a schematic block diagram illustrating a system that replaces the graphical user interface of an application program.

FIG. 3 illustrates an alternative embodiment of the present invention in which the language switch component 250 interacts more directly with the application program 170 through an interface 300. The LRB 110 and LRM 120 function similar to the embodiments described in FIGS. 1 and 2. Therefore, FIG. 3 does not illustrate the LRB 110 and LRM 120 with the same detail as earlier.

The interface 300 is illustrated by a wider arrow connecting the language switch component 250 to the application program 170. FIG. 3 illustrates the language switch component 250 replacing the whole GUI 140 rather than individual LSEs 130, as shown in FIG. 2.

When the application program 170 begins execution, a default language is used to generate a GUI 140 in a manner similar to that described with FIG. 1. For example, in FIG. 3 the GUI 140a represents the original GUI 140 generated using LSEs 130 provided by the English LRB 110. Next, a user may change the selected language 160 in a manner similar to that described with FIG. 2. Therefore, the language switch component 250 communicates with the application program 170 using the interface 300.

Initially, the language switch component 250 preempts execution of the application program 170. In one embodiment, preemption is implemented through an interrupt sent to the Operating System (OS). Those of skill in the art recognize there are many ways to interrupt an application program 170 during its execution including signals sent directly to the application program 170, through an OS interrupt, and the like.

Next, the language switch component 250 stores a state of the application program 170. Generally, executing programs have some form of state information. State information includes information such as the values for certain variables, where the program is in its execution flow, what the current input values are, which windows and other GUI components are being displayed, as well as other information about execution of the program 170. In one implementation, only state information concerning the GUI 140 (i.e. GUI 140a) is stored. Alternatively, all the state information for the application program 170 may be stored.

Thereafter, the language switch component 250 discards the current GUI 140 (i.e. GUI 140a). The current GUI 140 (i.e. GUI 140a) includes LSEs 130 that are in a language other than the new language 230 selected by the user. Generally, the GUI 140 is discarded by initializing the memory and data structures of the computer that define the GUI 140.

The language switch component 250 then generates a new GUI 140 (e.g. GUI 140b). During the generation process, the language switch component 250 uses the LRM 120, in one embodiment, to create LSEs 130 in the new GUI 140 that correspond to the new language 230 (e.g. GUI 140b, corresponds to the French LRB 110). One embodiment uses the same process of generating LSEs 130 for the new GUI 140 as discussed with FIG. 1.

Finally, the language switch component 250 restores the state of the application program 170 and resumes execution of the program 170. Restoring the state of the application program 170 may include displaying the same window as was displayed when the language was switched, setting the focus in the GUI 140 (e.g. GUI 140b) to the same GUI component as before, and other changes such that the user may continue working with the application program 170 as though nothing has changed besides the language. In this manner, the application program 170 has dynamically changed the language used for displayable LSEs 130.

The embodiment in FIG. 3 also illustrates an ability of the present invention to provide multiple language support and switch functionality to one or more application programs. In one embodiment, the language switch component 250 may be configured to identify which application program 170 requests a new language 230. Accordingly, the language switch component 250 may then interface 300 with a particular application program 170.

In another embodiment, the LRM 120 may be implemented as a server program configured to provide language switching features, similar to those described in FIG. 2, to a plurality of application programs 170. Application programs 170 may execute on the same computer or be in network communication with the language switch component 250 and/or LRM 120.

Figure 4:
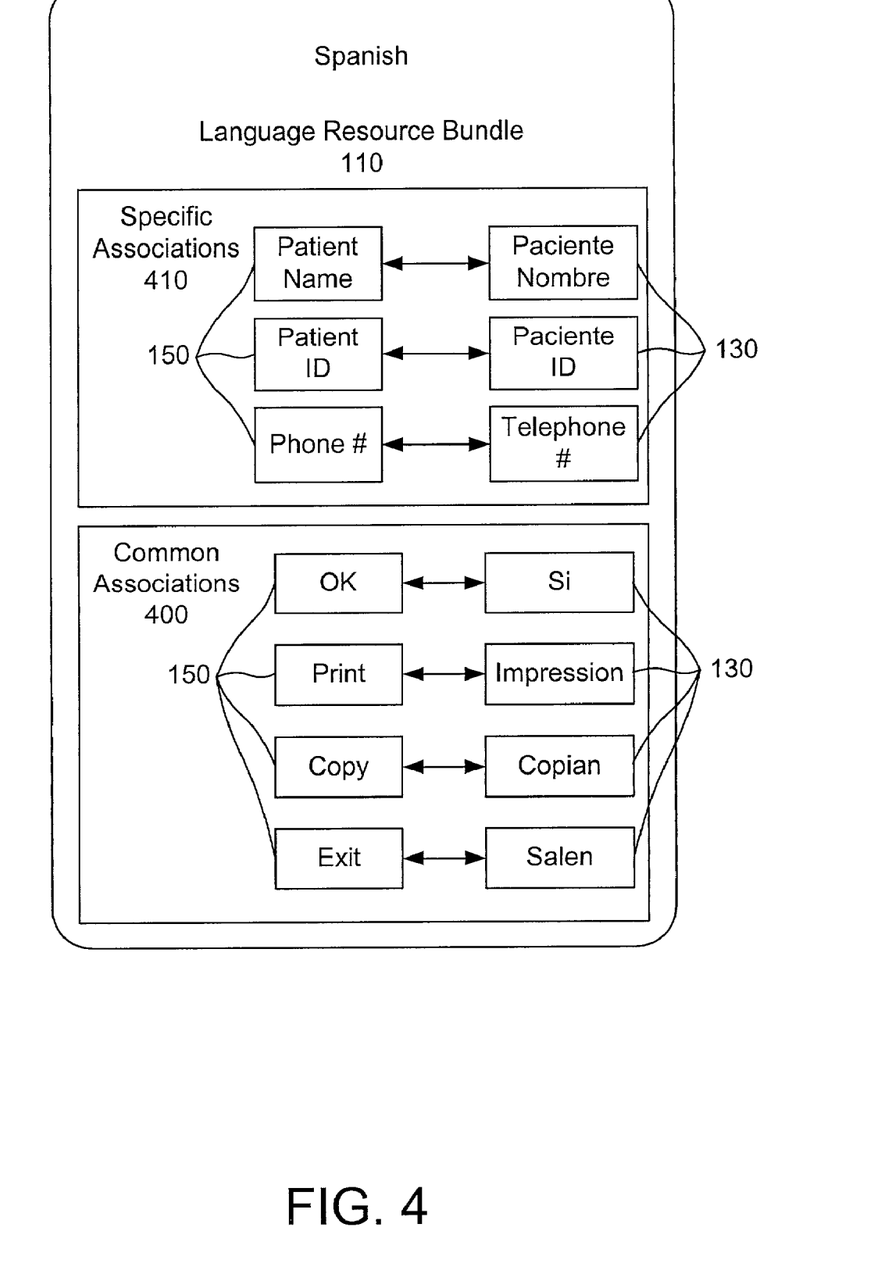
FIG. 4 is a block diagram of components within a language resource bundle.

FIG. 4 illustrates a language resource bundle (LRB) 110 in more detail according to one embodiment of the present invention. The LRB 110 may correspond to a particular language (e.g. Spanish). Those of skill in the art readily recognize that a variety of data structures may be used to implement the LRB 110, such as an array, a stack, a queue, and the like. Alternatively, an LRB 110 may be implemented as an object having access methods that allow the LRB 110 to receive a language key 150 and return the appropriate LSE 130. Such implementations are contemplated within the scope of the present invention.

Generally, an LRB 110 includes a set of associations between language keys 150 and LSEs 130. Of course, more associations may exist than those illustrated. In one embodiment, a language key 150 is a unique identifier used in the application program 110 as a place holder where an LSE 130 needs to be displayed during execution. Preferably, there is a one to one correspondence between each language key 150 and each LSE 130 within a particular LRB 110.

In one embodiment, an LRB 110 includes two different types of associations between language keys 150 and LSEs 130. For example, a first group of associations may comprise common associations 400. Common associations 400 may include associations that are common to a plurality of application programs 170. As illustrated in FIG. 4, the language keys 150 for "OK", "Print", "Copy", and "Exit" are included in the group of common associations 400. These language keys 150 may be text titles for buttons, menu items or other GUI 140 components in a typical application program 170. Therefore, a single LRB 110 may service one or more application programs 170 that require these common associations 400.

In addition, an LRB 110 may include a set of associations 410 having language keys 150 that are specific to a particular application program 170. For example, a hospital patient inventory program 170 may record the patient's name, ID number, and phone number, among other information. These elements may require field identifiers in a particular GUI 140 that are LSEs 130. Therefore, the LRB 110 may contain specific language keys 150 to provide LSE 130 field identifiers in the appropriate language. For example, "Paciente Nombre" may be the LSE 130 to replace the "Patient Name". The illustrated specific associations 410 may be very different from another application program 170 designed to teach children math, for example.

A single LRB 110 may include one or more sets of specific associations 410 allowing it to support more than one application program 170. Alternatively, the present invention may include a plurality of LRBs 110. Each LRB 110 may correspond to a particular language as well as a particular set of associations, specific 410 and common 400. Those of skill in the art will recognize that the LRB 110 illustrated may be configured differently and still serve the same purpose. Other configurations of the LRB 110 are considered within the scope of this present invention.

In one presently preferred embodiment, the LSEs 130 stored in the LRB 110 are implemented as objects rather than descriptors. In this manner, the LRM 120 may simply provide a copy of an LSE 130 or an address to the LSE 130 in computer memory rather than creating the LSE 130 for each request of the LSE 130 made by an application program 170. For example, rather than simple text, an LSE 130 may include a graphic. The graphic may be stored completely within the LRB 110. In this manner, the LRM 120 need not re-load or create a commonly requested LSE 130. Re-loading or re-creating a more complicated LSE 130, such as a graphic, for each request may slow the response time of the LRM 120 and diminish performance.

Figure 5:
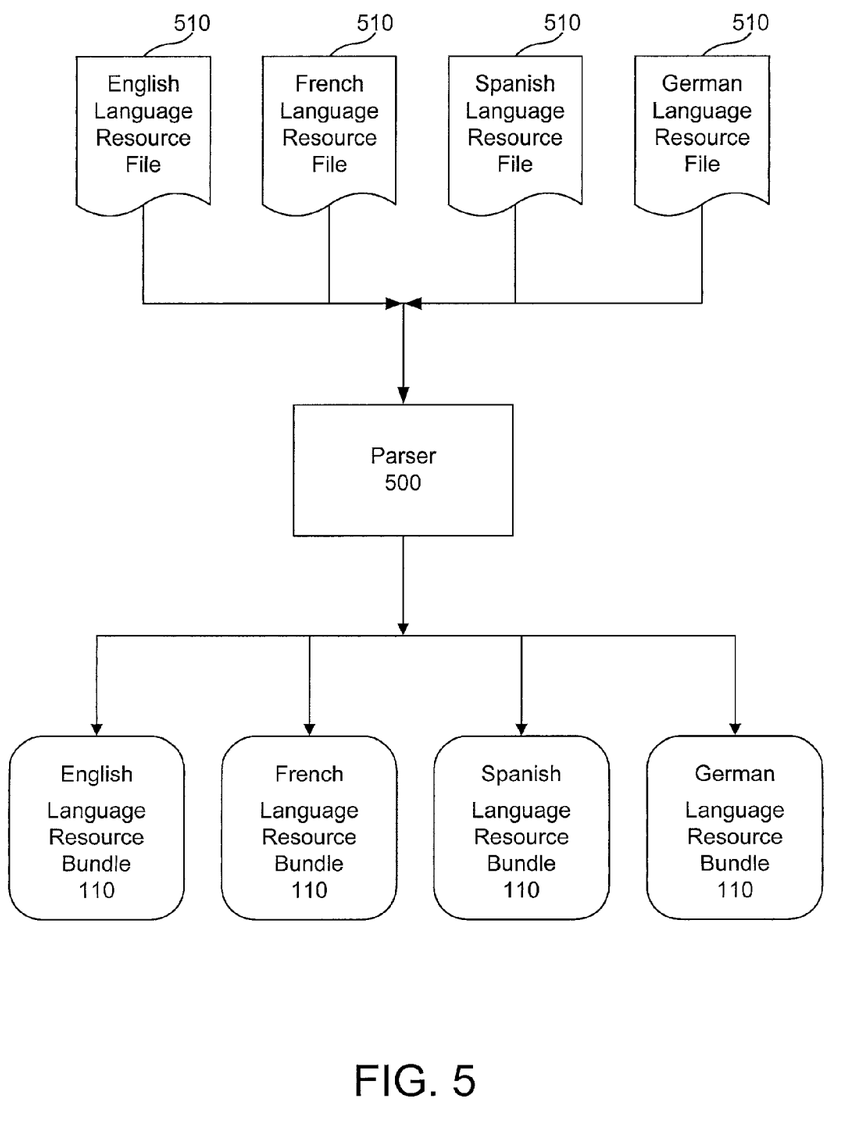
FIG. 5 is a schematic block diagram illustrating a parser within a system for supporting multiple languages.

FIG. 5 illustrates a parser 500 for generating LRBs 110 according to an embodiment of the invention. In one embodiment, a parser 500 generates one LRB 110 to correspond to each language supported. The parser 500 converts human-readable text containing associations between language keys 150 and LSEs 130 into a machine useable format.

The parser 500 may be configured to accept a language resource file 510 (LRF) for any language and generate therefrom a corresponding LRB 110. An LRF 510 is a file comprised of text organized such that a person may read the file and understand what text represents file keys 150 and what part represents LSEs 130. The details of an LRF 510 are discussed below.

The parser 500 may be configured to operate on one or a batch of LRFs 510. For example, all the LRFs 510 may be stored in a known directory on a hard drive. The parser 500 may examine the directory and parse all the LRFs 510 within the directory to create corresponding LRBs 110.

Alternatively, the parser 500 may operate on an as-needed basis. For example, when an application program 170 is initiated, the parser 500 may be used to create an LRB 110 for a default language, such as English. Thereafter, if the system 100 supports French, Spanish, and German, as illustrated, the parser 500 may be invoked by the LRM 120 to only create an LRB 110 when one does not exist. For example, having created an English LRB 110, the user may select German. This may cause the LRM 120 to request that the parser 500 create a German LRB 110. To do so, the parser 500 may be configured to distinguish between multiple LRFs 510 stored on a hard drive using a certain file naming convention. The parser 500 may then read in the German LRF 510 and create the German LRB 110.

Figure 6:
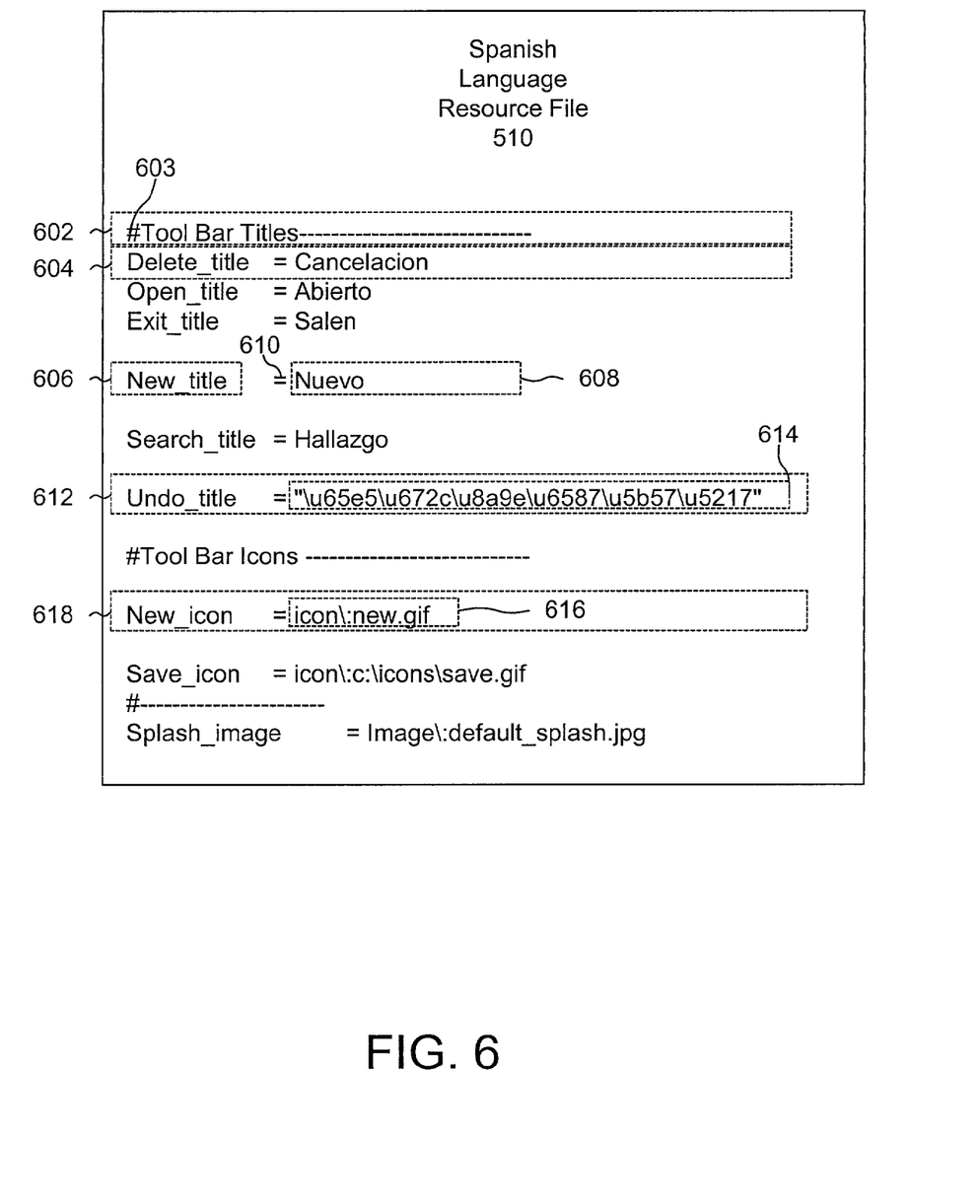
FIG. 6 illustrates a language resource file used to support a system for supporting multiple languages.

FIG. 6 illustrates one embodiment of an LRF 510. Preferably, the LRF 510 is organized such that a person easily read the LRF 510. This is accomplished by representing both language keys 150 and LSEs 130 using descriptors. As depicted, the descriptors may include text strings.

In one embodiment, LRF 510 may include one or more comment lines 602 generally used to notify a human reader concerning various certain sections of the LRF 510. For example, as shown in FIG. 6, a comment line 602 indicates that the lines that follow relate to tool bar titles in the GUI 140. Sectioning the LRF 510 aids in finding particular language key 150 or LSE 130 descriptors.

The parser 500 identifies comment lines 602 by a token 603 such as a number symbol. Of course other tokens 603 may be used to indicate a comment line 602. Generally, the parser 500 ignores the comment lines 602.

Line 604 illustrates a first line that the parser 500 will recognize as an association. In one embodiment, a language key descriptor 606 is the first word of text on a line. The language key descriptor 606 is separated from the LSE descriptor 608 by an association token 610, such as "=". Generally, the text used in the LRF 510 for the language key descriptor 606 is the same as the language key 150 used in the application program 170 and the language key 150 used in the association in the LRB 110. Additionally, the language key descriptor 606 may be a string, a symbol, a character, a number, or similar indicator.

The LSE descriptor 608 to be associated with the language key descriptor 606 follows the token 610. For example, as depicted, "Nuevo" is a string LSE descriptor 608 to be associated with the language key 150 "New_title" in the LRB 110.

The LSE descriptor 608 may be a simple text string such as "Nuevo". However, the LSE descriptor 608 may also comprise an encoded indicator or an address. For example, in line 612, LSE descriptor 614 is a string of numbers, letters and symbols comprising a Unicode string. Unicode strings are a format that may be used to represent characters, symbols, and words from different languages in one common ASCII format. Typically, a Unicode character is indicated by a "\" followed by a hexadecimal number. The hexadecimal number corresponds to a character definition in a Unicode table.

As an address, the LSE descriptor 608 may indicate what type of LSE 130 is to be created and the location of other resources needed to create the LSE 130. For example, the LSE descriptor 616 corresponds to an icon. For example, the word "icon" following the association token 610 indicates that the LSE 130 is to be an icon. The ":\"may separate the LSE type identifier from the file name, file name and path or other address that must be accessed to create the proper LSE 130. LSE descriptor 616 may indicate that the parser 500 is to access a file "new.gif" located in a default directory to create the icon. FIG. 6 illustrates both icon, and image addresses. However, those of skill in the art recognize that the address may be a uniform resource locator (URL), sound clip file name, and other like addresses.

In an alternative embodiment, the parser 500 may simply convert the address LSE descriptors 616 into an intermediate machine readable form. The LRM 120 may processes the intermediate form. For example, the LRM 120 may follow the address to the resource needed to create an appropriate LSE 130, such as loading the icon into an LRB 110.

In this manner an LRF 510 provides a structure storing data that is both human-readable and machine-readable. A human readable LRF 510 allows the definition of LSEs 130 and support for different languages to be separated from the application program code. For example, FIG. 6 illustrates a Spanish LRF 510. To define the same LRF 510 in German, a translator having minimal training may simply read the Spanish LRF 510 and translate the Spanish LSE descriptors 608 into German. Similarly, the translator may create icons, and images that correspond to German from those provided for Spanish. Accordingly, the expensive time of a programmer is not required.

Preferably, the language key descriptors 606 clearly indicate what idea or words must be provided in the new language as an LSE 130. Therefore, an LRF template having only comment lines 602 and language key descriptors 606 may provide enough information to allow the translator to produce an operable LRF 510.

Figure 7:
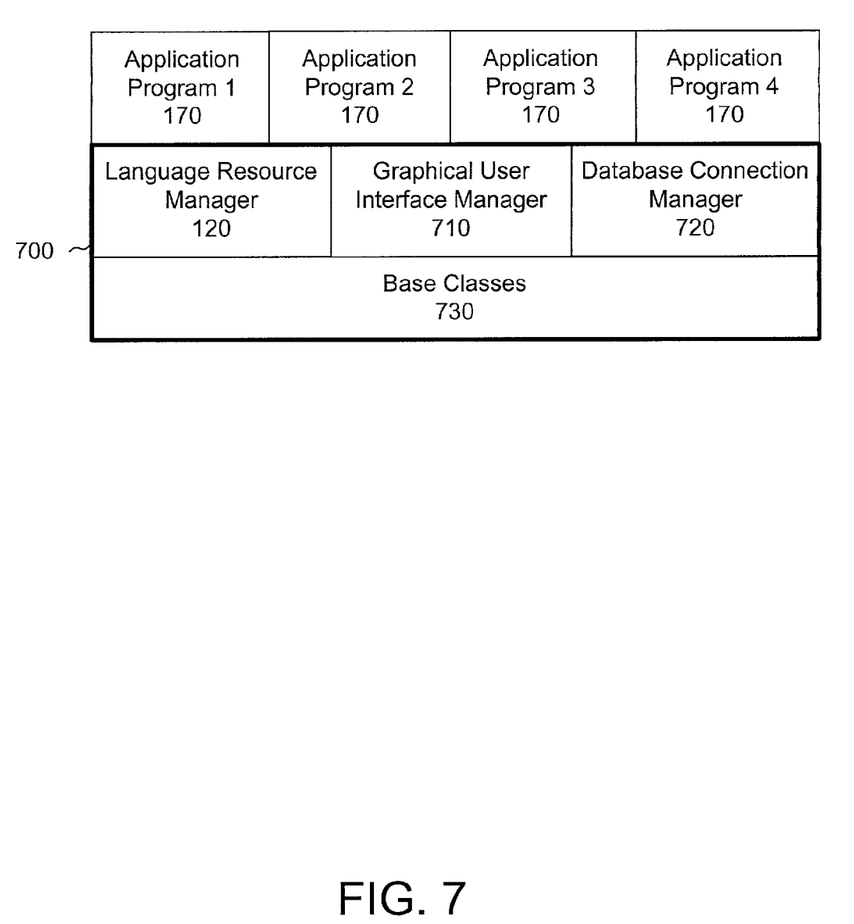
FIG. 7 is a block diagram illustrating use of the present invention in an application framework.

FIG. 7 illustrates an application framework 700 comprising a Language Resource Manager 120 (LRM) configured according to an embodiment of the present invention. An application framework 700, as indicated by the thick rectangle, is generally used to produce a suite of application programs 170 including a consistent user interface and other useful features. Application frameworks 700 are generally used as a starting point during the programming phase of an application program 170.

For example, most modern application programs 170 include a GUI 140. Accordingly, most application frameworks 700 include a graphical user interface manager 710 to organize GUI components, redraw the screen, and perform other functions common between applications 170. Similarly, a number of applications 170 may require standard network connections to a database. The application framework 700 may include a database connection manager 720 to provide consistent programming code for supporting those functions. Often, the application framework 700 includes base classes 730 to provide common functionality among descendant objects in an object oriented application 170.

The modular nature of the LRM 120 allows it to be included in an application framework 700. By doing so, all applications 170 developed using this framework 700 may, by default, include the multiple language support provided by the LRM 120. The only remaining task for a programmer is to identify common and specific LSEs and create a first LRF 510. The programmer then uses language keys 150 in the application program 170 to provide mulitple language support. As mentioned above, a first LRF 510 may be translated to allow support for any number of languages foreign to the programmer.

Other components such as the language switch component 250 (See FIG. 2), language switching mechanism 210 (See FIG. 2), and parser 500 (See FIG. 5) may also be included in the application framework 700. In this manner, the features of the various embodiments described above may be easily included in various applications 170. Additionally these components as well as the LRM 120 may be implemented as a server, a plug-in, a single class object, a dynamic linked library (DLL), or other module to allow the present invention to be used by a variety of multiple application programs 170.

Figure 8:
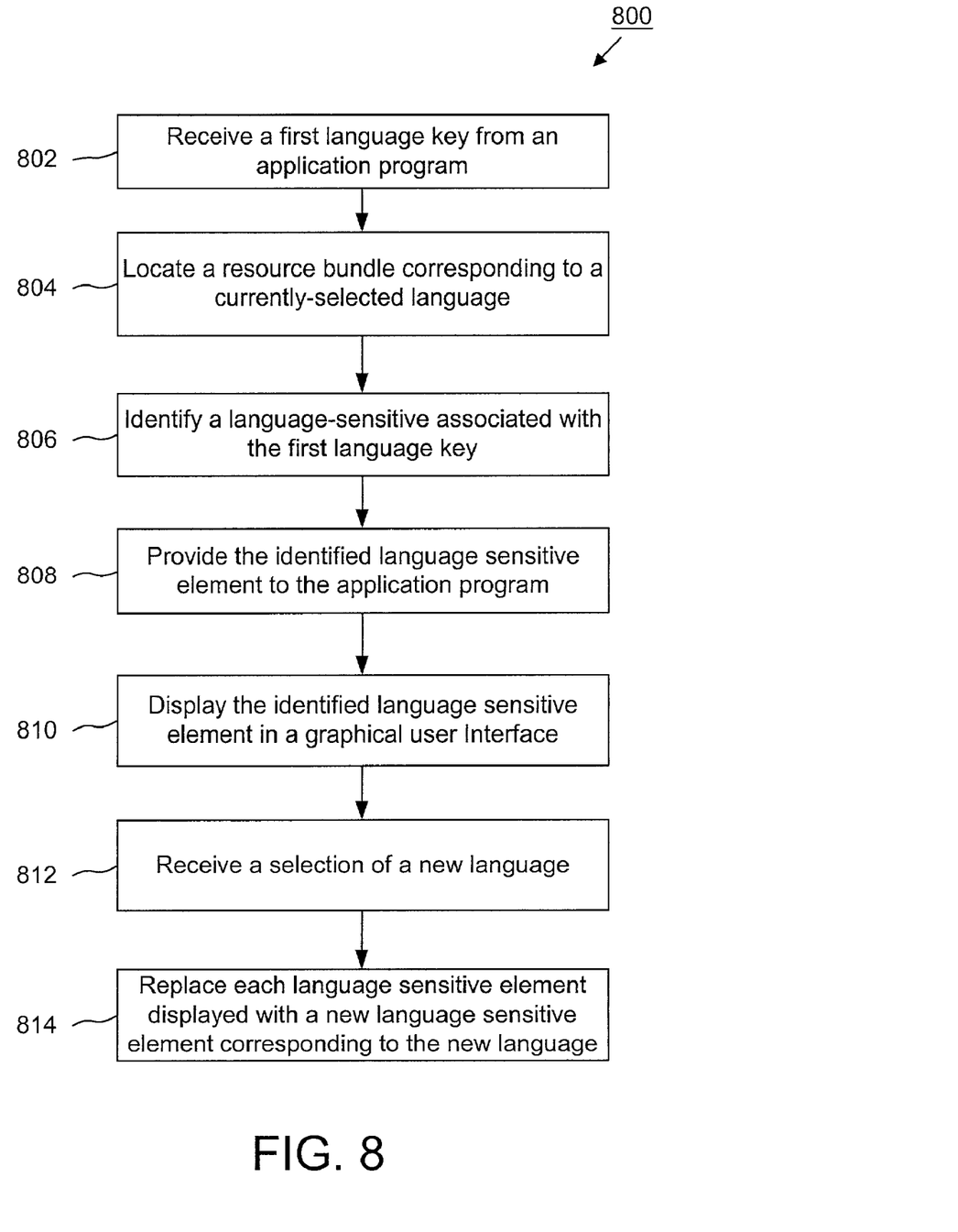
FIG. 8 is a flowchart of a method for providing dynamic multiple language support for one or more application programs.

Referring now to FIG. 8, there is shown a flowchart of one embodiment of a method 800 for providing multiple language support for at least one application program in a computer system. The method 800 begins when an LRM 120 receives 802 a first language key 150 from an application program 170.

The LRM 120 then locates 804 an LRB 110 that corresponds to the currently selected language 160. Thereafter, the LRM 120 identifies 806 an LSE 130 associated with the first language key 150 in the LRB 110. Next, the LRM 120 provides 808 the LSE 130 to the application program 170. Finally, the LSE 130 is displayed 810 in a GUI 140.

In one embodiment, a language switching mechanism 210 is displayed in the GUI 140. The language switching mechanism 210 may receive 812 a selection of a new language. A language switch component 250 may then replace 814 each displayed LSE 130 with a new LSE 130 provided by a language resource manager 120.

Based on the foregoing, the present invention offers numerous advantages not available in conventional approaches. For example, the present invention allows an application program 170 to be written in one language and deployed in multiple languages with minimal costs and overhead for translations and minimal computer programmer time. Support in a new language may be accomplished simply by having a translator translate LSE descriptors 608 in an LRF 510. In addition, the present invention allows an application program 170 to provide a graphical user interface 140 (GUI) that meets the user's needs without restarting the computer or the application program 170. The language of the GUI 140 may be switched when the person using the program 170 changes. The present invention separates computer programming code from the elements requiring translation into different languages. This aids in the maintenance and upgrading of the program 170. Additionally, the present invention is not limited to languages spoken in a certain location of the world, the location where the machine resides makes no difference, since the multiple language support is user-oriented.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A system for providing multiple language support for at least one application program, the system comprising:
   a plurality of language resource bundles comprising associations between language keys and displayable language-sensitive elements, each of said resource bundles corresponding to a different language, wherein at least one of said associations is specific to a particular application program and at least one of said associations is applicable to a plurality of different application programs;
a language resource manager configured to receive a first language key from a first application program, locate a language resource bundle corresponding to a currently-selected language, identify a first language-sensitive element associated with the first language key and the first application program, and provide the first language-sensitive element to the first application program for display in a graphical user interface; and
a language switching component configured, in response to a change in the currently-selected language, to send to the language resource manager the first language key corresponding to the first language-sensitive element displayed in the graphical user interface, receive from the language resource manager a second language-sensitive element, and replace the first language-sensitive element with the second language-sensitive element in the graphical user interface by preempting the first application program, saving a state of the first application program, discarding the graphical user interface being currently displayed, generating a new graphical user interface comprising the second language-sensitive element provided by the language resource manager, restoring the state of the first application program, and resuming execution of the first application program.

2. The system of claim 1, wherein the first application program is configured to provide a language key to the language resource manager, receive a language-sensitive element from the language resource manager, and display the language-sensitive element in a graphical user interface.

3. The system of claim 1, wherein at least one language-sensitive element is selected from the group consisting of a text string, an icon, a graphic, and a video clip.

4. The system of claim 1, wherein the language resource manager is further configured to display a language switching mechanism in the graphical user interface for changing the currently-selected language in response to user input.

5. The system of claim 4, wherein the language switching mechanism is selected from the group consisting of a drop-down list, a menu, a button, an edit box, and an icon.

6. The system of claim 1, wherein the language resource manager is further configured to change the currently-selected language in response to at least one keystroke.

7. The system of claim 1, wherein the language resource manager is in communication with a plurality of applications to receive language keys and provide language-sensitive elements.

8. The system of claim 1, further comprising:
a parser configured to parse a language resource file comprising descriptors of language keys and descriptors of language-sensitive elements and to generate therefrom a language resource bundle.

9. The system of claim 8, wherein the language resource file comprises human-readable text.

10. The system of claim 8, wherein at least one descriptor of a language key is selected from the group consisting of a string, a character, a number, and a symbol.

11. The system of claim 8, wherein at least one descriptor of a language-sensitive element comprises a Unicode string.

12. The system of claim 8, wherein at least one descriptor of a language-sensitive element comprises an address.

13. The system of claim 12, wherein the address comprises a file name.

14. The system of claim 12, wherein the address comprises a uniform resource locator (URL).

15. The system of claim 1, wherein the language resource manager is a component of a framework used by a plurality of application programs.

16. A method for providing multiple language support for at least one application program, the method comprising:
providing a plurality of language resource bundles comprising associations between language keys and displayable language-sensitive elements, each of said resource bundles corresponding to a different language, wherein at least one of said associations is specific to a program and at least one of said associations is applicable to a plurality of different application programs;
receiving a first language key from a first application program,
locating a language resource bundle corresponding to a currently-selected language;
identifying a language-sensitive element associated with the first language key and the first application program;
providing the identified language-sensitive element to the first application program for display in a graphical user interface; and
in response to a change in the currently-selected language;
sending the first language key corresponding to a first language-sensitive element displayed in the graphical user interface;
receiving a second language-sensitive element in response to said second language key; and
replacing the first language-sensitive element with the second language-sensitive element in the graphical user interface, wherein replacing comprises:
preempting the first application program;
saving a state of the first application program;
discarding the graphical user interface being currently displayed;
generating a new graphical user interface comprising the second language-sensitive element;
restoring the state of the first application program; and
resuming execution of the first application program.

17. The method of claim 16, further comprising:
displaying the language-sensitive element in a graphical user interface.

18. The method of claim 16, wherein at least one language-sensitive element is selected from the group consisting of a text string, an icon, a graphic, and a video clip.

19. The method of claim 16, further comprising:
displaying a language switching mechanism in the graphical user interface for changing the currently-selected language in response to user input.

20. The method of claim 19, wherein the language switching mechanism is selected from the group consisting of a drop-down list, a menu, a button, an edit box, and an icon.

21. The method of claim 16, further comprising:
changing the currently-selected language in response to at least one keystroke.

22. The method of claim 16, further comprising:
receiving language keys from a plurality of application programs; and
providing corresponding language-sensitive elements to each of the plurality of application programs.

23. The method of claim 16, further comprising:
parsing a language resource file comprising descriptors of language keys and descriptors of language-sensitive elements to generate therefrom a language resource bundle.

24. The method of claim 23, wherein the language resource file comprises human-readable text.

25. The method of 23, wherein at least one descriptor of a language key is selected from the group consisting of a string, a character, a number, and a symbol.

26. The method of claim 23, wherein at least one descriptor of a language-sensitive element comprises a Unicode string.

27. The method of claim 23, wherein at least one descriptor of a language-sensitive element comprises an address.

28. The method of claim 27, wherein the address comprises a file name.

29. The method of claim 27, wherein the address comprises a uniform resource locator (URL).

30. A system for providing multiple language support for at least one application program, the system comprising:
   a plurality of language resource bundles comprising associations between language keys and displayable language-sensitive elements, each of said resource bundles corresponding to a different language;
   a language switching component to preempt an application program, save a state of the application program, discard the graphical user interface being currently displayed, generate a new graphical user interface comprising at least one new language-sensitive element indicated by a language resource bundle for a received language key, restore the state of the application program, and resume execution of the application program.

31. The system of claim 30, further comprising:
   a parser configured to parse a language resource file comprising descriptors of language keys and descriptors of language-sensitive elements and to generate therefrom a language resource bundle.

32. The system of claim 31, wherein the language resource file comprises human-readable text.

33. A method for providing multiple language support for at least one application program, the method comprising:
   providing a plurality of language-resource bundles comprising associations between language keys and displayable language-sensitive elements, each of said language resource bundles corresponding to a different language;
   receiving a first language key;
   locating a language resource bundle corresponding to a currently-selected language;
   identifying a language-sensitive element associated with the first language key;
   preempting the application program;
   saving a state of the application program;
   discarding the graphical user interface being currently displayed by the application program;
   generating a new graphical user interface for the application program comprising at least one new language-sensitive element indicated by the located language resource bundle for the first language key;
   restoring the state of the application program; and
   resuming execution of the application program.

34. The method of claim 33, further comprising:
   parsing a language resource file comprising descriptors of language keys and descriptors of language-sensitive elements and to generate therefrom a language resource bundle.

35. The method of claim 34, wherein the language resource file comprises human-readable text.

36. A system for providing multiple language support for at least one application program, the system comprising:
   a parser to parse a language resource file written in human-readable text and comprising descriptors of language keys and descriptors of language-sensitive elements and generate therefrom a language resource bundle comprising associations between language keys and displayable language-sensitive elements for a particular language; wherein a language switching component is to preempt the application program, save a state of the application program, discard the graphical user interface being currently displayed, generate a new graphical user interface comprising at least one new language sensitive element indicated by a corresponding language resource bundle for a received language key, restore the state of the application program, and resume execution of the application program.

37. The system of claim 36, wherein at least one descriptor of a language key is selected from the group consisting of a string, a character, a number, and a symbol.

38. The system of claim 36, wherein at least one descriptor of a language-sensitive element comprises a Unicode string.

39. The system of claim 36, wherein at least one descriptor of a language-sensitive element comprises an address.

40. The system of claim 39, wherein the address comprises a file name.

41. The system of claim 39, wherein the address comprises a uniform resource locator (URL).

* * * * *